United States Patent
Tsukano et al.

(10) Patent No.: US 9,739,341 B2
(45) Date of Patent: Aug. 22, 2017

(54) TORSIONAL VIBRATION REDUCING DEVICE

(71) Applicant: TOYOTA JIDOSHA KABUSHIKI KAISHA, Toyota-shi (JP)

(72) Inventors: Fusahiro Tsukano, Susono (JP); Yu Miyahara, Susono (JP); Hiroyuki Amano, Susono (JP); Yuji Suzuki, Kariya (JP); Morihiro Matsumoto, Susono (JP); Atsushi Honda, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/966,765

(22) Filed: Dec. 11, 2015

(65) Prior Publication Data

US 2016/0169319 A1 Jun. 16, 2016

(30) Foreign Application Priority Data

Dec. 16, 2014 (JP) ................................. 2014-253728

(51) Int. Cl.
*F16F 15/14* (2006.01)

(52) U.S. Cl.
CPC .................................. *F16F 15/145* (2013.01)

(58) Field of Classification Search
CPC ................................................... F16F 15/145
USPC .......................... 188/378, 379, 380; 74/574.2
See application file for complete search history.

(56) References Cited

U.S. PATENT DOCUMENTS

| | | | | |
|---|---|---|---|---|
| 5,976,020 A | * | 11/1999 | Lohaus | F16F 15/1205 192/30 V |
| 6,109,134 A | * | 8/2000 | Sudau | F16F 15/13157 192/207 |
| 6,374,698 B1 | * | 4/2002 | Carlson | F16F 15/145 192/207 |
| 6,382,050 B1 | * | 5/2002 | Carlson | F16F 15/145 464/24 |
| 8,708,116 B2 | * | 4/2014 | Miyahara | F16F 15/145 192/3.29 |
| 8,850,927 B2 | * | 10/2014 | Kinoshita | F16F 15/145 74/572.2 |
| 9,032,837 B2 | * | 5/2015 | Klotz | F16F 15/145 74/574.2 |
| 2012/0255394 A1 | * | 10/2012 | Maienschein | F16F 15/145 74/574.2 |

(Continued)

FOREIGN PATENT DOCUMENTS

DE 10 2010 054 294 A1 6/2011
JP 7-280037 A 10/1995

(Continued)

*Primary Examiner* — Thomas J Williams
*Assistant Examiner* — Mariano Sy
(74) *Attorney, Agent, or Firm* — Oblon, McClelland, Maier & Neustadt, L.L.P.

(57) ABSTRACT

A torsional vibration reducing device includes a rotating body, rolling bodies, and a connection member. The rotating body includes guide holes, and the connection member includes accommodating portions that has at least two contact portions. The accommodating portions are positioned in the guide holes, and the guide holes accommodate the rolling bodies. The accommodating portions are configured to hold the outer peripheral surface of each of the rolling bodies with the contact portions, in a direction in which the rolling body reciprocates.

5 Claims, 6 Drawing Sheets

(56) References Cited

U.S. PATENT DOCUMENTS

| | | | |
|---|---|---|---|
| 2013/0283966 A1* | 10/2013 | Baral | F16F 15/145 |
| | | | 74/574.2 |
| 2014/0066216 A1 | 3/2014 | Tone et al. | |
| 2015/0000999 A1* | 1/2015 | Amano | F16H 45/02 |
| | | | 181/209 |
| 2015/0276014 A1* | 10/2015 | Aijima | F16F 15/145 |
| | | | 74/572.2 |
| 2016/0169318 A1 | 6/2016 | Miyahara et al. | |
| 2016/0169320 A1* | 6/2016 | Suzuki | F16F 15/145 |
| | | | 188/378 |
| 2016/0327118 A1* | 11/2016 | Miyahara | F16F 15/145 |

FOREIGN PATENT DOCUMENTS

| | | |
|---|---|---|
| JP | 2000-297843 A | 10/2000 |
| JP | 2013-148211 | 8/2013 |
| JP | 2014-47805 | 3/2014 |
| JP | 2016-114169 A | 6/2016 |

\* cited by examiner

TORSIONAL VIBRATION REDUCING DEVICE

INCORPORATION BY REFERENCE

The disclosure of Japanese Patent Application No. 2014-253728 filed on Dec. 16, 2014 including the specification, drawings and abstract is incorporated herein by reference in its entirety.

BACKGROUND OF THE INVENTION

1. Field of the Invention

The invention relates to a device that reduces torsional vibration by reciprocation of a rolling body.

2. Description of Related Art

One example of this type of device is described in Japanese Patent Application Publication No. 2014-47805. The device includes a plate member that is attached to a crankshaft of an engine. A recessed accommodating portion that is formed in an annular shape is formed in the plate member. A plurality of mass bodies that reciprocate by fluctuations in transmitted torque are disposed in the accommodating portion. The mass bodies are connected by connection members that are disposed along opposite side surfaces of the mass bodies.

Also, Japanese Patent Application Publication No. 2013-148211 describes a torsional vibration reducing device including an inertial mass body composed of a first pendulum member and a second pendulum member. Connection members are provided on opposite side surfaces of each of the pendulum members. The connection members of the pendulum members are connected to each other via a spring.

In a configuration described in JP 2014-47805 A, when the mass bodies reciprocate by the fluctuations in the torque, the side surfaces of the mass bodies and the connection members possibly come into contact with each other. When the mass bodies reciprocate in a state in which the side surfaces of the mass bodies and the connection members are in contact with each other, sliding friction between the side surfaces of the mass bodies and the connection members produces resistance to hinder the reciprocation of the mass bodies. Damping performance is thereby possibly deteriorated. The inconvenience as described above may be also similarly caused in the invention described in JP 2013-148211 A.

SUMMARY OF THE INVENTION

The invention provides a torsional vibration reducing device having excellent damping performance by reducing sliding friction between rolling bodies and a member that connects the rolling bodies.

A torsional vibration reducing device is provided. The torsional vibration device includes a rotating body, a plurality of rolling bodies, and a connection member. The rotating body is configured to receive torque and rotate. The rotating body has a plurality of guide holes. The plurality of guide holes is provided at a predetermined interval in a circumferential direction of the rotating body. The plurality of rolling bodies is accommodated in the plurality of guide holes, respectively. Each of the plurality of rolling bodies is configured to reciprocate in the circumferential direction of the rotating body when the torque fluctuates in a state in which the rotating body is rotating. The connection member is configured to connect the plurality of rolling bodies. The connection member includes a plurality of accommodating portions. The plurality of accommodating portions is positioned in the plurality of guide holes, respectively. Each of the plurality of accommodating portions is configured to hold each of the rolling bodies on an outer peripheral surface of the rolling body. The width of each of the accommodating portions in an axial direction of the rotating body is larger than a movement length of the center of gravity of each of the rolling bodies in the axial direction of the rotating body when the rolling body reciprocates. Each of the accommodating portions is configured to hold the outer peripheral surface of each of the rolling bodies from the outer peripheral surface side within a range including the movement length. An inner surface of each of the accommodating portions includes at least two contact portions. The contact portions are configured to come into contact with the outer peripheral surface of each of the rolling bodies in a direction in which the rolling body reciprocates.

According to the above aspect of the invention, the contact portions are configured to come into line contact with the outer peripheral surface of each of the rolling bodies in the direction in which the rolling body reciprocates.

According to the above aspect of the invention, the contact portions are configured to come into point contact with the outer peripheral surface of each of the rolling bodies in the direction in which the rolling body reciprocates.

According to the above aspect of the invention, the respective contact portions are configured to come into contact with each of the rolling bodies on the outer peripheral surface of the rolling body on an outer side with respect to the center of gravity of the rolling body in a radial direction of the rotating body. The contact portions are in both sides of the center of gravity in the circumferential direction of the rotating body. The contact portions are configured to come into line contact with the outer peripheral surface of each of the rolling bodies.

According to the above aspect of the invention, the respective contact portions are configured to come into contact with each of the rolling bodies on the outer peripheral surface of the rolling body on an outer side with respect to the center of gravity of the rolling body in a radial direction of the rotating body. The contact portions are in both sides of the center of gravity in the circumferential direction of the rotating body. The contact portions are configured to come into point contact with the outer peripheral surface of each of the rolling bodies.

In accordance with the invention, the two contact portions formed in the inner surface of each of the accommodating portions of the connection member come into line contact or point contact with the outer peripheral surface of each of the rolling bodies. Therefore, a contact area between the rolling body and the connection member can be reduced as compared to a case in which the connection member is disposed along a side surface of the rolling body and the rolling body and the connection member are in surface contact with each other. Accordingly, it is possible to reduce sliding friction between the rolling body and the connection member when the rolling body reciprocates by the fluctuations in the transmitted torque. It is also possible to suppress a situation in which the sliding friction produces resistance to hinder the reciprocation of the rolling body. Also, each of the accommodating portions is formed with a larger width than the movement length of the center of gravity of each of the rolling bodies in the axial direction of the rotating body when the rolling body reciprocates, and each of the accommodating portions holds the range including the movement length within the outer peripheral surface of each of the rolling bodies from the outer peripheral surface side of the rolling body. That is, the accommodating portion supports the center of gravity of the rolling body. Thus, a load associated with contact between the connection member and the rolling body is applied to the center of gravity of the rolling body. Therefore, even when the load is applied to the rolling body, it is possible to suppress inclination of the rolling body with respect to the reciprocation direction with a yaw moment being generated in the rolling body by the load. As a result, the rolling body can be stably reciprocated, and damping performance can be improved.

Also, in accordance with the invention, an increase in an axial length of the torsional vibration reducing device can be suppressed as compared to the case in which the connection member is disposed along the side surface of the rolling body. Moreover, it is not necessary to provide a configuration for connecting the rolling bodies in the rolling body, and a machining cost of the rolling body can be correspondingly reduced. The two contact portions come into line contact or point contact with the outer peripheral surface on the outer side with respect to the center of gravity of the rolling body in the radial direction of the rotating body and on the opposite sides across the center of gravity of the rolling body in the circumferential direction of the rotating body. Accordingly, even when the rolling body is to move outward in the radial direction of the rotating body, the outer peripheral surface of the rolling body is caught by the two contact portions. It is thus possible to suppress escape of the rolling body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
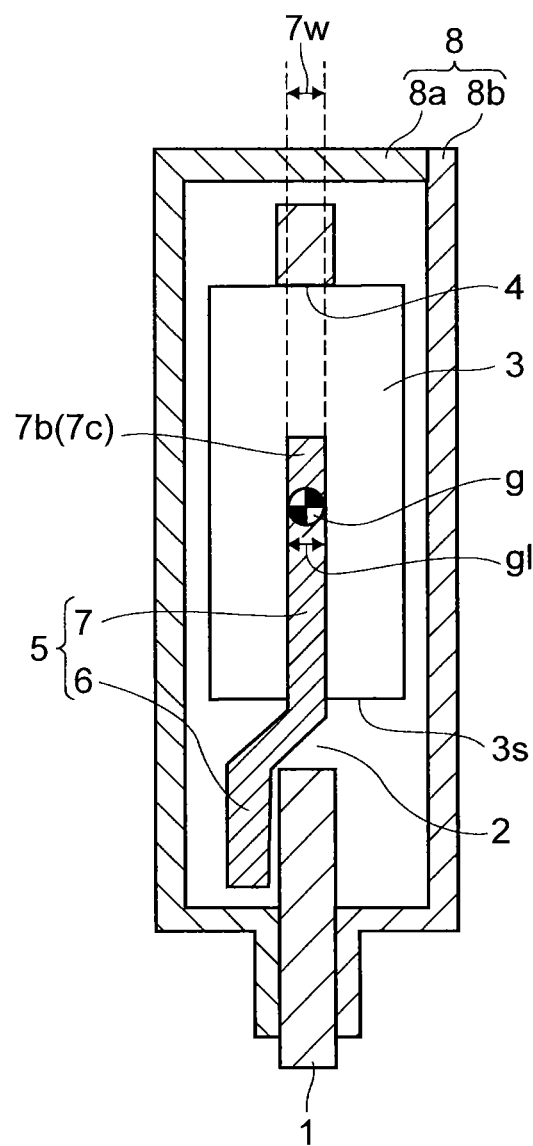
FIG. 1 is a sectional view in a rotating body axial direction illustrating a portion in one example of an embodiment of a torsional vibration reducing device.
Figure 2:
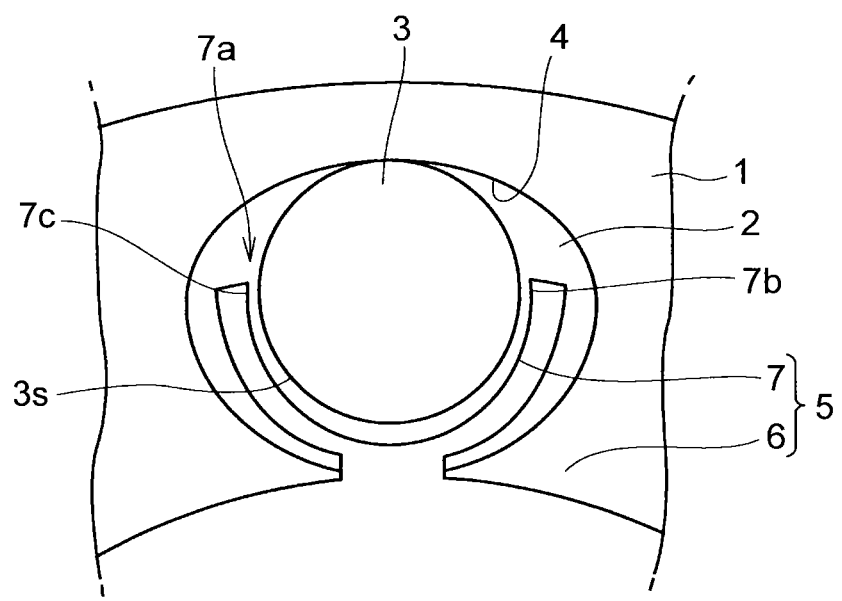
FIG. 2 is an enlarged view of a portion in one example of the embodiment of the torsional vibration reducing device as viewed axially.

FIG. 1 is a sectional view in a rotating body axial direction illustrating a portion in one example of an embodiment of a torsional vibration reducing device. FIG. 2 is an enlarged view of a portion in one example of the embodiment of the torsional vibration reducing device as viewed axially. The torsional vibration reducing device includes a rotating body 1 that is attached to an object to be damped. The rotating body 1 is a disk-shaped member. Circumferentially-long guide holes 2 are formed passing through the rotating body 1 in a plate thickness direction at positions radially shifted from the center of rotation of the rotating body 1. The guide holes 2 are formed at predetermined intervals in a circumferential direction of the rotating body 1. As one example, the number of the guide holes 2 is eight.

Figure 3:
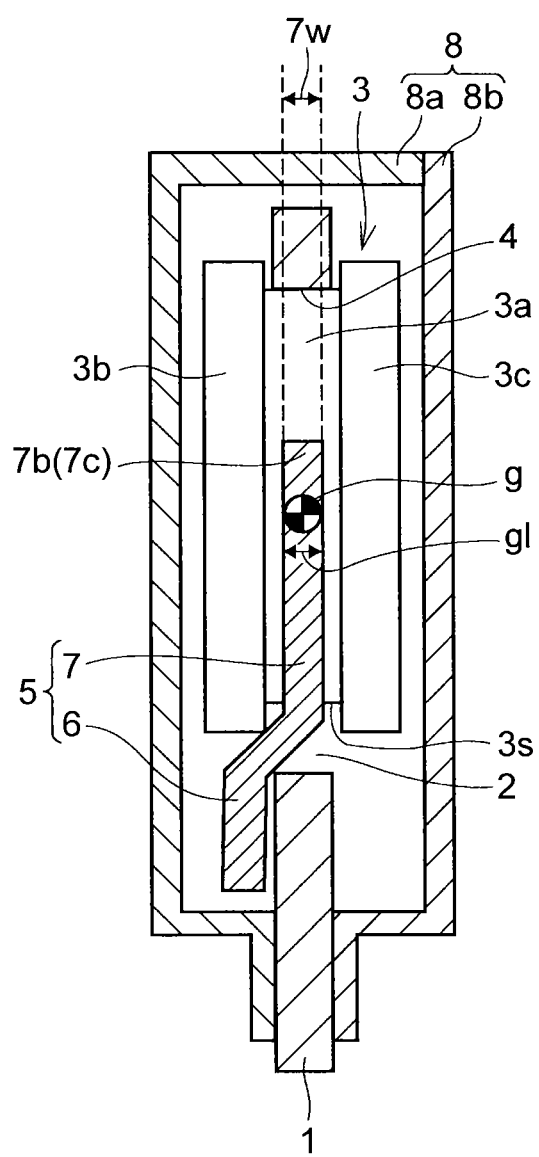
FIG. 3 is a sectional view in the rotating body axial direction illustrating a portion in an example in which a rolling body shown in FIG. 1 is changed to a rolling body having an H shape in section.

A rolling body 3 that reciprocates by an inertial force when torque transmitted to the rotating body 1 fluctuates is disposed within each of the guide holes 2. The rolling body 3 is pressed against an inner surface of the guide hole 2 on an outer side in a radial direction of the rotating body 1 out of inner surfaces of the guide hole 2 by a centrifugal force when the rotating body 1 rotates. The rolling body 3 rolls along the inner surface. In the following description, the inner surface of the guide hole 2 on the outer side in the radial direction of the rotating body 1 out of the inner surfaces of the guide hole 2 is referred to as a guide surface 4. A portion of the rolling body 3 in contact with the guide surface 4 has a circular shape in section in the radial direction of the rotating body 1. Therefore, the rolling body 3 may be a member having a simple disk or cylindrical shape as shown in FIG. 1. The rolling body 3 may be also formed in an "H" shape in section in the axial direction of the rotating body 1 so as not to escape from the guide hole 2 in the axial direction as shown in FIG. 3. That is, disk-shaped flange portions 3b, 3c having a larger outer diameter than an outer diameter of a disk-shaped or cylindrical-shaped body portion 3a may be provided on opposite end portions of the body portion 3a. The flange portions 3b, 3c may be caught by side surfaces of the rotating body 1. The rotating body 1 and the rolling body 3 are preferably formed of a metal material in order to satisfy strength and mass requirements for the rotating body 1 and the rolling body 3.

The rolling bodies 3 are connected together by a connection member 5 so as to be reciprocatable on the guide surfaces 4. The connection member 5 is preferably formed of, for example, a synthetic resin material so as not to hinder the reciprocation of the rolling bodies 3. The connection member 5 includes an annular support portion 6. The support portion 6 is disposed along a side surface of the rotating body 1. Accommodating portions 7 that hold the rolling bodies 3 are provided at positions corresponding to the guide holes 2 in a circumferential direction of the support portion 6. For example, the number of the accommodating portions 7 provided in the circumferential direction of the support portion 6 is eight. In the example shown in FIG. 1, the accommodating portion 7 is formed so as to be shifted in the axial direction of the rotating body 1 from the support portion 6, and is disposed in the guide hole 2. Also, the accommodating portion 7 is configured to hold the rolling body 3 within a plane passing through a gravity center g of the rolling body 3 and perpendicular to the axial direction of the rotating body 1. To be more specific, the rolling body 3 may move in the axial direction of the rotating body 1 when the rolling body 3 reciprocates by the fluctuations in the transmitted torque. The axial movement of the rolling body 3 is referred to as back-and-forth movement in the following description. That is, a position of the gravity center g of the rolling body 3 on the guide surface 4 is changed in the axial direction. A width 7w of the accommodating portion 7 in the axial direction is formed to be equal to or larger than a movement length gl of the gravity center g of the rolling body 3 in the axial direction. The accommodating portion 7 is also disposed in the guide hole 2 so as to hold a range including the movement length gl of the gravity center g within an outer peripheral surface 3s of the rolling body 3 from the outer peripheral surface 3s-side. Accordingly, the accommodating portion 7 supports the gravity center g of the rolling body 3 that reciprocates in the circumferential direction of the rotating body 1 by the torque fluctuations, and moves back and forth in the axial direction of the rotating body 1.

Moreover, each of the accommodating portions 7 is formed in an almost semicircular shape opening outward in the radial direction of the rotating body 1 as shown in FIG. 2. The rolling body 3 is fitted into the accommodating portion 7. That is, the rolling body 3 is held from the outer peripheral surface 3s-side. A portion of the outer peripheral surface 3s of the rolling body 3 is exposed from an opening portion 7a that opens outward in the radial direction. Accordingly, when the rolling body 3 moves outward in the radial direction of the rotating body 1 by a centrifugal force, a portion of the outer peripheral surface 3s of the rolling body 3 is exposed from the opening portion 7a, and the exposed outer peripheral surface 3s is pressed against the guide surface 4.

In the example shown FIG. 2, portions of an inner surface of the accommodating portion 7 on the outer side in the radial direction of the rotating body 1, that is, opposite end portions of the opening portion 7a in the circumferential direction of the rotating body 1 have arc surfaces having a larger radius of curvature than a radius of curvature of the rolling body 3 so as to come into line contact or point contact with the outer peripheral surface 3s of the rolling body 3. The opposite end portions are contact portions in the invention. In the following description, the opposite end portions of the opening portion 7a are referred to as contact portions 7b, 7c. The accommodating portion 7 is formed such that the contact portions 7b, 7c are disposed on the outer side with respect to the gravity center g of the rolling body 3 in the radial direction of the rotating body 1 and on opposite sides of the gravity center g in the circumferential direction of the rotating body 1 when the rolling body 3 is moved to a position farthest from the center of the rotating body 1 in the guide hole 2 by a centrifugal force. Accordingly, it is possible to suppress escape of the rolling body 3 from the accommodating portion 7 of the connection member 5 to the outer side in the radial direction of the rotating body 1, and generation of abnormal sound with the escaped rolling body 3 colliding with the inner surfaces of the guide hole 2. When the rolling body 3 reciprocates, the contact portions 7b, 7c alternately come into line contact or point contact with the outer peripheral surface 3s of the rolling body 3. In a case in which the rolling body 3 having an "H" shape in section as shown in FIG. 3 is used, the outer peripheral surface 3s of the body portion of the rolling body 3 is held by the accommodating portion 7 of the connection member 5.

As shown in FIGS. 1, 3, a portion of the rotating body 1 from a radially intermediate portion up to an outer peripheral end is surrounded by a casing 8. The guide holes 2, the rolling bodies 3, and the connection member 5 described above are disposed in a hollow portion of the casing 8. The casing 8 is composed of a first case member 8a and a second case member 8b that, for example, are projected outwardly in the axial direction and entirely formed in an annular shape. Inner peripheral side portions of the case members 8a, 8b are positioned close to each other to sandwich an inner peripheral portion of the rotating body 1. The case members 8a, 8b are thereby integrated with the rotating body 1. An end portion on an outer peripheral side of the first case member 8a covers an outer peripheral end surface of the rotating body 1 and extends toward the second case member 8b. Outer peripheral end portions of the case members 8a, 8b are integrated together.

An operation and an effect of the torsional vibration reducing device having the above configuration will be described. When the rotating body 1 rotates, the rolling body 3 is moved to a position farthest from the center of the rotating body 1 in the guide hole 2 by a centrifugal force. When the torque of the rotating body 1 fluctuates, the rolling body 3 reciprocates within the guide hole 2, that is, in a state in which the rolling body 3 is pressed against the guide surface 4 by an inertial force. Torsional vibration of the rotating body 1 is reduced by the reciprocation of the rolling body 3 as described above. The connection member 5 reciprocates along with the reciprocation of the rolling body 3. When the fluctuations in the torque are increased, an amplitude of the reciprocation of the rolling body 3 is correspondingly increased, and the rolling body 3 possibly approaches the inner surfaces of the guide hole 2 in the circumferential direction of the rotating body 1. However, in the above configuration, since the accommodating portion 7 that holds the rolling body 3 is disposed in the guide hole 2, direct contact or collision between the rolling body 3 and the inner surfaces of the guide hole 2 other than the guide surface 4 is suppressed. Thus, it is possible to suppress the generation of abnormal sound due to the contact or the collision. Here, when the rotating body 1 and the rolling body 3 are formed of a metal material, and the connection member 5 is formed of a synthetic resin material as described above, it is possible to prevent generation of abnormal sound due to contact between metals, and to allow the connection member 5 to work as a cushioning material. The generation of abnormal sound can be thereby more effectively suppressed. Also, deterioration in durability of the rolling body 3 and the guide hole 2 can be thereby suppressed.

As described above, the rolling body 3 may move in the axial direction of the rotating body 1 when the rolling body 3 reciprocates. The accommodating portion 7 of the connection member 5 is configured to hold the range including the movement length gl of the gravity center g of the rolling body 3 in the axial direction within the outer peripheral surface 3s of the rolling body 3. Therefore, even when the rolling body 3 moves back and forth in the axial direction when reciprocating along the guide surface 4, the gravity center g of the rolling body 3 is supported by the accommodating portion 7. Therefore, a load associated with contact between the outer peripheral surface 3s of the rolling body 3 and each of the contact portions 7b, 7c of the connection member 5 is applied to an axially center portion of the rolling body 3, that is, the gravity center g. Thus, even when the load associated with the contact is applied to the rolling body 3, it is difficult for a yaw moment that rotates the rolling body 3 with respect to a direction in which the rolling body 3 reciprocates to be generated. It is possible to suppress inclination of the rolling body 3 when the rolling body 3 reciprocates. Also, each of the contact portions 7b, 7c comes into line contact or point contact with the outer peripheral surface 3s of the rolling body 3. Therefore, a contact area between the rolling body 3 and the connection member 5 can be reduced as compared to a case in which the connection member 5 is disposed along a side surface of the rolling body 3 and the rolling body 3 and the connection member 5 are in surface contact with each other. It is possible to suppress sliding friction between the rolling body 3 and the connection member 5. It is also possible to suppress a situation in which the sliding friction produces resistance to hinder the reciprocation of the rolling body 3. As a result, the rolling body 3 can be stably reciprocated, and damping performance can be improved.

On the other hand, when the centrifugal force applied to the rolling body 3 is reduced along with a decrease in rotation speed of the rotating body 1 to be smaller than gravity applied to the rolling body 3, the rolling body 3 is to move to a lower portion in the guide hole 2 by the gravity. The rolling bodies 3 are held in the accommodating portions 7 of the connection member 5, respectively. The rolling bodies 3 held in the accommodating portions 7 are balanced with each other so as to be point-symmetrical about a rotation center axis of the rotating body 1 as the center of symmetry. Therefore, the movement of the rolling body 3 to the lower portion in the guide hole 2 becomes slow, and a load associated with contact between the rolling body 3 and the inner surfaces of the guide hole 2 via the connection member 5 becomes small. As described above, the outer peripheral surface 3s of the rolling body 3 is difficult to be in direct contact with the inner surfaces of the guide hole 2 other than the guide surface 4. As a result, the generation of abnormal sound in association with the contact between the rolling body 3 and the inner surfaces of the guide hole 2 can be suppressed. Also, the durability of the rolling body 3 and the guide surface 4 can be thereby improved.

In the torsional vibration reducing device having the above configuration, since the connection member 5 is overlappingly disposed on an inner side of the rolling body 3 in the radial direction of the rotating body 1, an increase in an axial length of the torsional vibration reducing device can be suppressed as compared to the case in which the connection member 5 is disposed along the side surface of the rolling body 3. Moreover, the accommodating portion 7 of the connection member 5 is disposed in the guide hole 2, and holds the outer peripheral surface 3s of the rolling body 3. Thus, a space in the guide hole 2 in the radial direction of the rotating body 1 can be reduced. That is, free movement of the rolling body 3 in the guide hole 2 can be limited, so that the generation of abnormal sound described above can be also suppressed. Also, it is not necessary to change a shape of the rolling body 3 in order to connect the plurality of rolling bodies 3. It is thus possible to facilitate design, production, and machining of the rolling body 3, and correspondingly suppress a cost of the rolling body 3.

Figure 4:
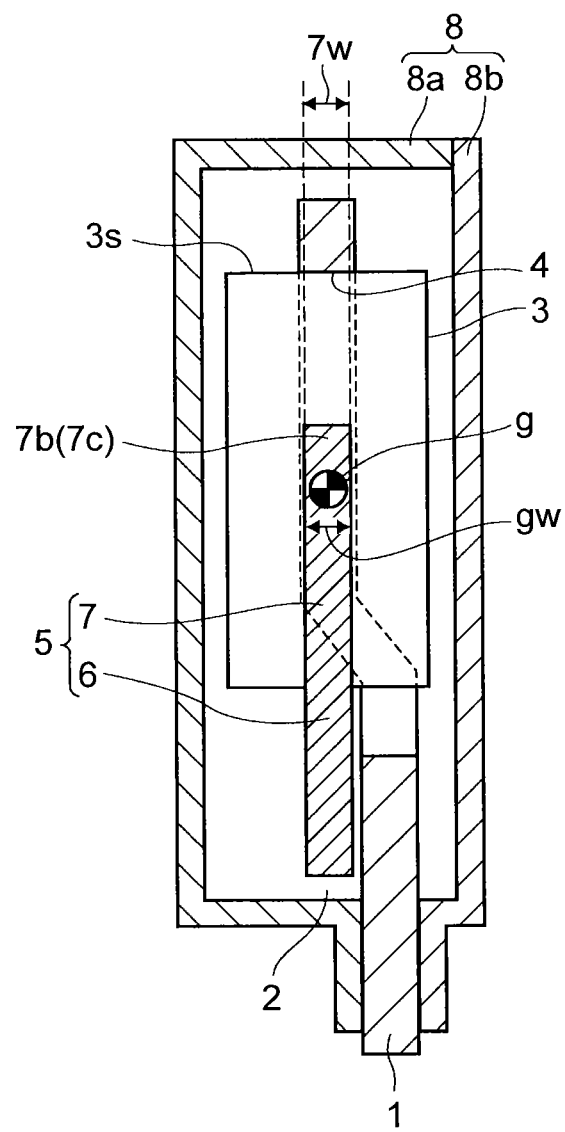
FIG. 4 is a sectional view in the rotating body axial direction illustrating a portion in another example of the embodiment of the torsional vibration reducing device.

FIG. 4 is a sectional view illustrating a portion in another example of the embodiment of the torsional vibration reducing device. The example shown therein is an example in which an outer portion of the rotating body 1 in the radial direction of the rotating body 1, in which the guide surface 4 is formed, is formed at a position shifted in the axial direction of the rotating body 1 from an inner portion of the rotating body 1. On the other hand, the connection member 5 is formed in a flat disk shape. That is, the support portion 6 is formed in a flat annular shape. The accommodating portions 7 are formed at the positions corresponding to the guide holes 2 in the circumferential direction of the support portion 6 similarly to the configuration shown in FIG. 1. In the example shown in FIG. 4, the rolling body 3 is formed in a simple disk or cylindrical shape.

Figure 5:
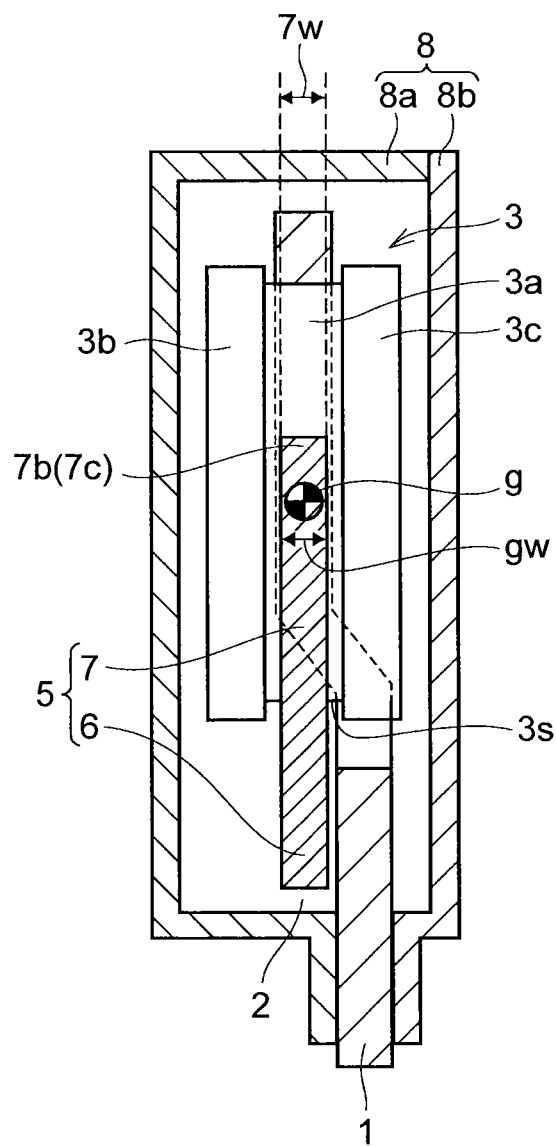
FIG. 5 is a sectional view in the rotating body axial direction illustrating a portion in an example in which a rolling body shown in FIG. 4 is changed to a rolling body having an H shape in section.

FIG. 5 shows an example in which the rolling body 3 having an "H" shape in section is disposed in the guide hole 2 instead of the rolling body 3 having a simple disk or cylindrical shape shown in FIG. 4. The accommodating portion 7 of the connection member 5 shown in FIG. 5 holds the outer peripheral surface 3s of the body portion of the rolling body 3.

In configurations shown in FIGS. 4, 5, the accommodating portion 7 of the connection member 5 also holds the range including the movement length gl of the gravity center g of the rolling body 3 in the axial direction within the outer peripheral surface 3s of the rolling body 3. Therefore, even when the rolling body 3 moves back and forth in the axial direction when reciprocating along the guide surface 4, the gravity center g of the rolling body 3 is supported by the accommodating portion 7. Also, when the rolling body 3 reciprocates, each of the contact portions 7b, 7c of the connection member 5 comes into line contact or point contact with the outer peripheral surface 3s of the rolling body 3. Therefore, a similar operation and effect to those of the examples shown in FIGS. 1, 3 can be also obtained in the configurations shown in FIGS. 4, 5.

Figure 6:
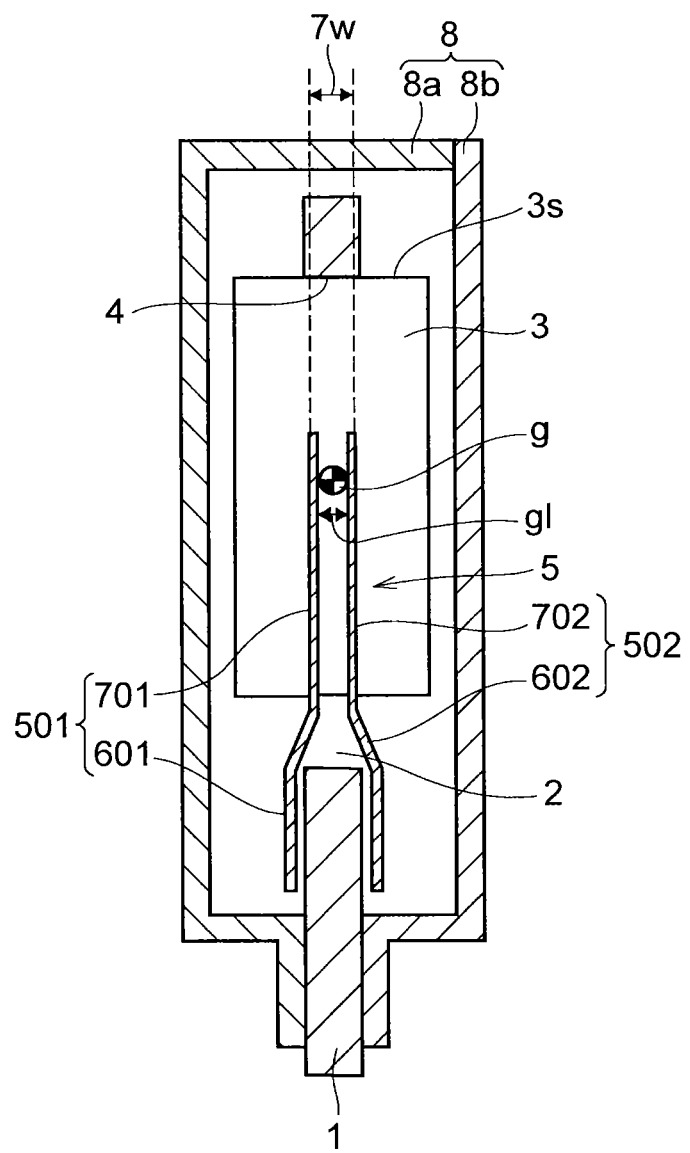
FIG. 6 is a sectional view in the rotating body axial direction illustrating a portion in yet another example of the embodiment of the torsional vibration reducing device.

FIG. 6 is a sectional view illustrating a portion in yet another example of the embodiment of the torsional vibration reducing device. The example shown therein is an example in which the connection member 5 is composed of two annular members having the same shape. To be more specific, a plate thickness of each of a first annular member 501 and a second annular member 502 is formed to be smaller than a plate thickness of the above connection member 5. Therefore, support portions 601, 602 are formed in a thin flat annular shape. Accommodating portions 701, 702 similarly having a small plate thickness are provided at the positions corresponding to the guide holes 2 in the circumferential direction of the support portions 601, 602. In the example shown in FIG. 6, the accommodating portions 701, 702 are formed so as to be shifted in the axial direction of the rotating body 1 from the support portions 601, 602, respectively. Accordingly, the accommodating portions 701, 702 are disposed in the guide hole 2. Each of the accommodating portions 701, 702 is configured similarly to the accommodating portion 7 shown in FIGS. 1, 3 except that the plate thickness is smaller than a plate thickness of the accommodating portion 7 shown in FIGS. 1, 3.

The first annular member 501 and the second annular member 502 are disposed on opposite sides of the rotating body 1 in FIG. 6, that is, so as to be symmetrical with respect to the rotating body 1. In this case, the accommodating portions 701, 702 are positioned close to each other so as to overlap with each other such that an interval 7w between the accommodating portions 701, 702 is equal to or larger than the movement length gl of the gravity center g of the rolling body 3. The annular members 501, 502 are connected to each other by a pin (not shown). That is, the gravity center g of the rolling body 3 is supported by the accommodating portions 701, 702. Although the rolling body 3 is formed in a simple disk or cylindrical shape in the example shown in FIG. 6, the rolling body 3 having an "H" shape in section as shown in FIGS. 3, 5 may be employed. In this case, the outer peripheral surface 3s of the body portion 3a of the rolling body 3 having an "H" shape in section is held by the accommodating portions 701, 702.

In a configuration shown in FIG. 6, the accommodating portions 701, 702 also hold the range including the movement length gl of the gravity center g of the rolling body 3 within the outer peripheral surface 3s of the rolling body 3. Therefore, even when the rolling body 3 moves back and forth in the axial direction when reciprocating along the guide surface 4, the gravity center g of the rolling body 3 is supported by the accommodating portions 7. Also, when the rolling body 3 reciprocates, each of the contact portions 7b, 7c of the connection member 5 comes into line contact or point contact with the outer peripheral surface 3s of the rolling body 3. Therefore, a similar operation and effect to those of the examples shown in FIGS. 1, 3, 5 can be also obtained in the configuration shown in FIG. 6.

Note that the guide surface 4 may be continuously formed in the circumferential direction of the rotating body 1. To be more specific, a hollow portion passing through the rotating body 1 in the plate thickness direction is formed throughout an entire periphery of the rotating body 1, and an inner surface of the annular hollow portion on the outer side in the radial direction of the rotating body 1 out of inner surfaces of the annular hollow portion is formed as a curved surface that is changed into concave and convex shapes continuously in the radial direction of the rotating body 1. An inner surface of the hollow portion on the inner side in the radial direction of the rotating body 1 out of the inner surfaces of the hollow portion is formed as a simple arc surface. A portion defined between portions with a small space between the inner surface on an outer peripheral side and the inner surface on an inner peripheral side may be employed as the guide hole 2 into which the rolling body 3 is inserted. The inner surface on the outer peripheral side may be employed as the guide surface 4.

What is claimed is:

1. A torsional vibration reducing device comprising:
    a rotating body configured to receive torque and rotate, the rotating body having a plurality of guide holes, the plurality of guide holes being provided at a predetermined interval in a circumferential direction of the rotating body;
    a plurality of rolling bodies that are accommodated in the plurality of guide holes, respectively, each of the plurality of rolling bodies being configured to reciprocate in the circumferential direction of the rotating body when the torque fluctuates in a state in which the rotating body is rotating; and
    a connection member configured to connect the plurality of rolling bodies, the connection member including a plurality of accommodating portions,
        the plurality of accommodating portions being positioned in the plurality of guide holes, respectively,
        each of the plurality of accommodating portions being configured to hold each of the plurality of rolling bodies on an outer peripheral surface of each of the plurality of rolling bodies,
        a width of each of the plurality of accommodating portions in an axial direction of the rotating body being larger than a movement length of a center of gravity of each of the plurality of rolling bodies in the axial direction of the rotating body when each of the plurality of rolling bodies reciprocates,
        each of the plurality of accommodating portions being configured to hold the outer peripheral surface of each of the plurality of rolling bodies from a side of the outer peripheral surface within a range including the movement length, and
        an inner surface of each of the plurality of accommodating portions including at least two contact portions, the contact portions being configured to come into contact with the outer peripheral surface of each of the plurality of rolling bodies in a direction in which each of the plurality of rolling bodies reciprocates.

2. The torsional vibration reducing device according to claim 1, wherein
    the contact portions are configured to come into line contact with the outer peripheral surface of each of the plurality of rolling bodies in the direction in which each of the plurality of rolling bodies reciprocates.

3. The torsional vibration reducing device according to claim 1, wherein
    the contact portions are configured to come into point contact with the outer peripheral surface of each of the plurality of rolling bodies in the direction in which each of the plurality of rolling bodies reciprocates.

4. The torsional vibration reducing device according to claim 1, wherein
    the respective contact portions are configured to come into contact with each of the plurality of rolling bodies on the outer peripheral surface of each of the plurality of rolling bodies on an outer side with respect to the center of gravity of each of the plurality of rolling bodies in a radial direction of the rotating body,
    the contact portions are in both sides of the center of gravity in the circumferential direction of the rotating body, and
    the contact portions are configured to come into line contact with the outer peripheral surface of each of the plurality of rolling bodies.

5. The torsional vibration reducing device according to claim 1, wherein
    the respective contact portions are configured to come into contact with each of the plurality of rolling bodies on the outer peripheral surface of each of the plurality of rolling bodies on an outer side with respect to the center of gravity of each of the plurality of rolling bodies in a radial direction of the rotating body,
    the contact portions are in both sides of the center of gravity in the circumferential direction of the rotating body, and
    the contact portions are configured to come into point contact with the outer peripheral surface of each of the plurality of rolling bodies.

* * * * *